United States Patent [19]

Drucker

[11] 4,205,360
[45] May 27, 1980

[54] POWER LINE CARRIER APPARATUS

[75] Inventor: Melvin H. Drucker, Denville, N.J.

[73] Assignee: Westinghouse Electric Corp., Pittsburgh, Pa.

[21] Appl. No.: 927,217

[22] Filed: Jul. 24, 1978

[51] Int. Cl.² ............................................. H02H 7/20
[52] U.S. Cl. ................................. 361/68; 340/310 A; 361/64; 375/7; 375/41
[58] Field of Search ....................... 361/68, 64, 66, 69; 340/310 R, 310 A, 288; 325/21, 22, 23, 30, 150, 362, 364, 482

[56] References Cited

U.S. PATENT DOCUMENTS

| | | | |
|---|---|---|---|
| 2,594,371 | 4/1952 | Ward | 340/310 A X |
| 3,117,241 | 1/1964 | Paynter et al. | 325/21 X |
| 3,327,215 | 6/1967 | Battin et al. | 325/21 X |
| 3,626,297 | 12/1971 | Green et al. | 340/310 A |
| 3,656,112 | 4/1972 | Paull | 340/310 A |
| 3,942,168 | 3/1976 | Whyte | 340/310 R |
| 4,054,837 | 10/1977 | Hibbs, Jr. et al. | 325/21 |
| 4,055,807 | 10/1977 | Priniski et al. | 325/21 |

Primary Examiner—Patrick R. Salce
Attorney, Agent, or Firm—D. R. Lackey

[57] ABSTRACT

Power line carrier apparatus of the on-off type, including a local transmitter and receiver coupled to a transmission line for communication with a remote station. An adjustable attenuator, located between the transmission line and the bandpass input filter of the receiver, is responsive to the condition of the local transmitter. The attenuator functions as a signal equalizer, presenting a greater impedance to signals supplied to the input filter when the local transmitter is operating, than when it is not.

7 Claims, 2 Drawing Figures

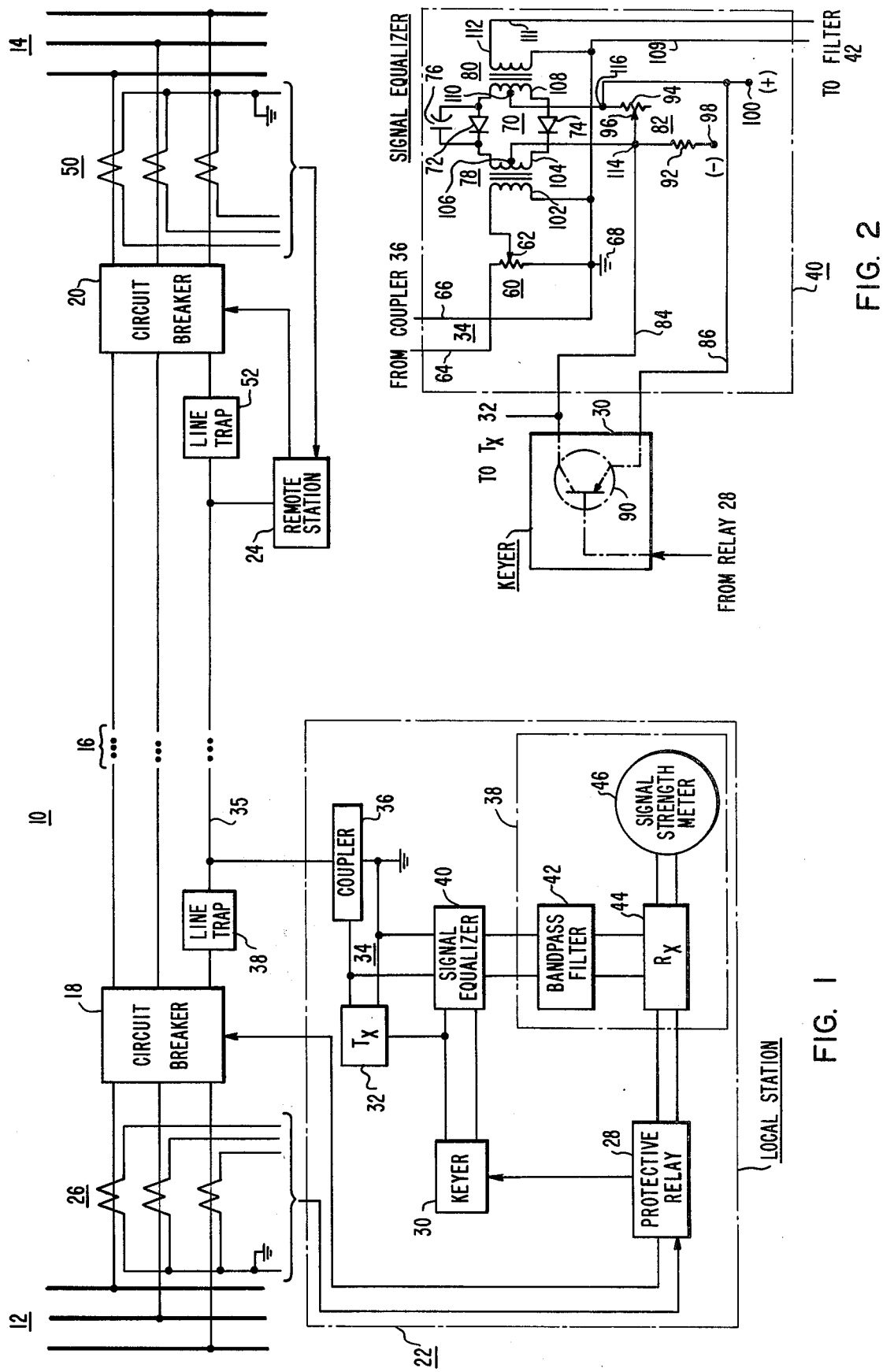

POWER LINE CARRIER APPARATUS

BACKGROUND OF THE INVENTION

1. Field of the Invention:

The invention relates to power line carrier apparatus used in protective relaying systems for the protection of electrical power systems.

2. Description of the Prior Art:

Certain types of protective relaying systems for monitoring and protecting electrical power systems utilize power line carrier of the on-off type for communication between local and remote stations. Predetermined system parameters are monitored at each station, and signals responsive to the monitored parameters are sent to the other station via power line carrier for comparison in a protective relay. The comparisons indicate whether a detected fault is internal, i.e., between the two stations, in which event the line sections should be isolated by tripping associated breakers, or external, in which event the circuit breakers are not tripped. For example, in a phase comparison protective relaying system, the three-phase line currents at each station are converted to a single-phase voltage. If there is no fault between the stations, these voltages will key their associated transmitters on alternate half cycles of the power system frequency. An internal fault will cause the stations to key their transmitters on the same half cycle. Thus, it is important that the receivers at each station receive and recognize a signal from the transmitter at the other station without delay, as an inaccurate representation of the phase relationship may cause improper operation of the protective relay. U.S. Pat. No. 2,406,615 entitled "Carrier Current Relying", is an example of a protective relaying system which utilizes on-off carrier for communication.

While in some carrier-current installations, the transmitters transmit at different radio frequencies, in others they transmit at the same radio frequency. When the transmitters operate at the same frequency, or a frequency within the pass-band of the input filter of the associate receiver, the local receiver is forced to operate whenever its local transmitter is transmitting a carrier signal. Under typical operating conditions, the receiver's sensitivity is set to respond to a signal level which is considerably lower in magnitude than that of the local transmitter output, to which it is directly connected. This forces the receiver circuitry to operate with an overwhelming carrier input signal level whenever the local transmitter is operating. This condition can cause a considerable time delay in the receiver drop-out response to the local transmitted carrier when it stops. This delay is primarily caused by the receiver input filter having to dissipate the relatively large carrier energy provided by the local transmitter, causing it to oscillate or "ring", and produce an output for a period of time after the carrier transmission has stopped. This condition has its most serious detrimental effect when the local and remote transmitters are keyed on and off alternately at the 60 Hertz power frequency rate, as would be the case when the hereinbefore mentioned "phase-comparison" relaying is employed. Thus, the critical timing relationship between the pulses derived from the receiver response to the local transmitter, and the receiver response to the remote signal, may be disrupted.

Thus, it would be desirable to be able to prevent overload of the band-pass input filter of the local receiver by the signal from the local transmitter, without resorting to costly squelch circuits following the input filter, or costly R-F hybrids which deleteriously affect either the transmitter output power efficiency, or the receiver sensitivity.

SUMMARY OF THE INVENTION

Briefly, the present invention is new and improved power line carrier protective relaying apparatus of the on-off type, which includes an adjustable attenuator between the transmission line and the input filter of the receiver. The adjustable attenuator is responsive to the condition of the local transmitter, providing a high attenuation of signals applied to the input filter when the local transmitter is transmitting a carrier signal, and a relatively low attenuation when it is not. In addition to functioning as a signal equalizer, between the signals of the local transmitter and those from a remote transmitter, it enables the signal strength meter of the receiver to provide an indication of the output level of the local transmitter.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 1 is a partially block and partially schematic diagram of an electrical power system which includes power line carrier apparatus constructed according to the teachings of the invention;

FIG. 2 is a schematic diagram of apparatus which may be used for a function shown in block form in FIG. 1, illustrating a preferred implementation of the invention.

DESCRIPTION OF THE PREFERRED EMBODIMENT

Referring now to the drawings and to FIG. 1 in particular, there is shown a three-phase electrical power system 10 which includes a first section 12 which may be connected to a source of alternating electrical energy, a second section 14 which may also be connected to a source of alternating electrical energy, and a protected section 16. The protected section 16 is connected to sections 12 and 14 via circuit breakers 18 and 20, respectively.

Circuit breakers 18 and 20 are controlled by protective relays 22 and 24, respectively, which will also be called the local and remote stations, respectively. Since the construction of the local and remote stations is the same, only the local station 22 will be described in detail.

The invention applies to any carrier-current protective relaying system in which a single-phase voltage is derived from predetermined circuit parameters. For purposes of example, it will be assumed that the protective relaying system is a phase comparison system, as described in the hereinbefore mentioned U.S. patent, and thus a detailed description of the protective relay construction will not be presented.

More specifically, the local station 22 includes a plurality of current transformers 26 which provide signals responsive to the current flowing in the three phases of the protected line section 16 at the local end. The outputs of current transformers 26 are applied to a protective relay 28 which may include the HCB network of U.S. Pat. No. 2,183,646 for deriving a single-phase voltage responsive to the three line currents. This voltage operates a transmitter keyer 30, which keys a transmitter 32 on and off according to the phase of the single-phase voltage applied to the keyer 30. Transmitter 32 is connected to a communication or transmission channel 34, such as a coaxial cable, and the radio frequency carrier current signal from transmitter 32 is applied to one of the conductors, such as conductor 35, of the protected line 16 via a conventional signal coupler 36. A conventional line trap 38 in conductor 35 enables the carrier current signal to flow in the protected line section 16 towards the remote station 24, while blocking it from flowing into line section 12.

A receiver 38 receives a radio frequency signal from conductor 35 of the protected line section 16 via coupler 36, and signal equalizing or attenuating means 40. The signal equalizing means 40 is constructed according to the teachings of the invention, with a preferred implementation thereof being shown in FIG. 2, which will be hereinafter described. Carrier-current signals from the local transmitter 32 will also be applied to receiver 38 via signal equalizer 40. Signal equalizer 40, in response to keyer 30, equalizes the signal levels of the local transmitter 32 and incoming signals from the remote station 24, ahead of a band-pass input filter 42 of receiver 38. The word "equalizes" does not necessarily mean that the signal levels of the local transmitter and the remote transmitter are made exactly the same. It means that they are processed such that they are equally suitable for application to the input filter 42.

Receiver 38 additionally includes the conventional receiver sections of power line carrier receivers, with these conventional portions being shown generally at 44, and a signal strength meter 46. The signal equalizer 40, in addition to its primary function of protecting the input filter 42 from being swamped by the signal from the local transmitter, makes it practical to utilize the signal strength meter 46 for measuring the output level of the local transmitter 32, in addition to its normal function of measuring the signal levels received from conductor 35 of the protected line section 16.

The receiver 38 provides an output signal for protective relay 28, responsive to signals applied to its input filter 42, and the protective relay 28 compares the inputs from current transformers 26 with the input from receiver 38, providing a trip signal for the trip coil of circuit breaker 18 when a predetermined phase relationship of the signals indicates an internal fault, i.e., a fault in the protected transmission line section 16.

In like manner, the remote station 24 compares the phase of a signal developed from current transformers 50 with the signal from transmitter 32, and it provides a trip signal for circuit breaker 20 when the phase relationship indicates an internal fault. Line trap 52 prevents the radio frequency carrier current signals on conductor 35 from entering line section 14.

FIG. 2 is a schematic diagram of a signal equalizer or adjustable attenuator 40 constructed according to the teachings of the invention, which may be used for the function 40 shown in block form in FIG. 1. The signals from communication channel or coaxial cable 34 is applied to an input attenuator 60 which may be an adjustable resistor having a selector arm 62. The inner conductor 64 of cable 34 is connected to one end of resistor 60, and the outer conductor 66 is connected to the other end, which end is also grounded at 68.

The adjustable selector arm 62 of resistor 60 is connected to input filter 42 via first signal coupling means 70, which includes a diode modulator having first and second diodes 72 and 74, respectively, and via second signal coupling means 76, such as a capacitor. Capacitor 76 is connected across one of the diodes, such as diode 72.

First and second matching transformers 78 and 80, respectively, are also utilized, along with adjustable bias means 82. The adjustable bias means 82 controls the diode modulator in response to the condition of keyer 30, and thus the condition of the local transmitter 32. The "condition" of keyer 30 is represented by a PNP transistor 90. Protective relay 28 turns transistor 90 on and off in response to the single-phase voltage derived from the three line currents, which voltage is applied to the base electrode of transistor 90. The collector electrode of transistor 90 is connected to transmitter 32 and to signal equalizer 40 via conductor 84, and the emitter electrode is connected to signal equalizer 40 via conductor 86.

Bias means 82 includes first and second resistors 92 and 94, respectively, with resistor 94 being an adjustable resistor having a selector arm 96, a source of negative unidirectional potential, represented by terminal 98, and a source of positive unidirectional potential, represented by terminal 100.

The first matching transformer 78 includes an input winding 102, and an output winding 104 having a center-tap 106, and the second matching transformer 80 includes an input winding 108 having a center-tap 110, and an output winding 112.

Input winding 102 of transformer 78 is connected to receive the signal developed between arm 62 of resistor 60 and ground 68, and the two ends of output winding 104 of transformer 78 are connected to the two ends of input winding 108 of transformer 80 via diodes 72 and 74. Output winding 112 of transformer 80 is connected to filter 42 via conductors 109 and 111, with conductor 109 also being connected to ground 68. The center-tap 106 of transformer 78 is connected to one end of resistor 92 at junction 114, and the other end of resistor 92 is connected to negative source voltage terminal 98. Junction 114 is additionally connected to conductor 84 and to selector arm 96 of adjustable resistor 94.

The center-tap 110 of transformer 80 is connected to one end of adjustable resistor 94 at junction 116. Junction 116 is additionally connected to conductor 86 and to the positive source voltage at terminal 100.

In the operation of the signal equalizer or attenuator 40, when transistor 90 is off, i.e., non-conductive, the positive voltage at terminal 100 is blocked from conductor 84. Thus, the diodes 72 and 74 of the diode modulator are forward biased by biasing means 82. Adjustable resistor 94 is initially set to provide the desired sensitivity for receiver 38, i.e., the degree of forward biasing is selected to operate on the desired portion of the diode conductivity curve. Thus, the signal voltage from selector arm 62, to ground 68, is applied to the input winding 102 of transformer 78. Since diodes 72 and 74 of the diode modulator 70 are forward biased, they will pass the radio frequency signal from the remote station 24 to the matching transformer 80, which in turn passes the signal to filter 42.

When relay 28 switches transistor 90 to its conductive state, the positive voltage at terminal 100 is applied to transmitter 32, keying it "on", and it is also applied to junction 114, reverse biasing diodes 72 and 74. The second signal coupling means 76, which had an inconsequential effect when diodes 72 and 74 were forward biased, is selected such that it "leaks" a selected small amount of the carrier signal from the local transmitter around the now blocking diode 76, which returns through the center-taps 106 and 110, as both are connected in common under this operating condition. Thus, only a desired portion of the carrier signal from the local transmitter 32 is applied to the output filter 42 of receiver 38. Adjustable resistor 60 is initially set to provide a meaningful indication on the signal strength meter 46 shown in FIG. 1, when the local transmitter 32 is transmitting at full power. When the local transmitter ceases to operate, the receiver is immediately ready to receive a signal from the remote transmitter.

I claim as my invention:

1. Power line carrier apparatus, comprising:
   local receiver including an input filter,
   a local transmitter,
   keying means for keying said local transmitter on and off,
   a transmission line,
   attenuation means,
   said receiver being connected to receive communication signals from said transmission line via said attenuation means, with said attenuation means being connected between said transmission line and the input filter of said receiver,
   said transmitter being connected to apply communications signals to said transmission line when it is keyed on by said keying means,
   said attenuation means having an attenuation which is responsive to whether said transmitter is keyed, presenting a higher attenuation to communication signals from said transmission line when said transmitter is keyed on, then when it is not transmitting,
   said attenuation means including a diode modulator connected between the transmission line and the input filter, and bias means for adjusting the bias of said diode modulator in response to the condition of the local transmitter, with said bias means forward biasing said diode modulator when the local transmitter is not transmitting, to enable communication signals to pass from the transmission line to the input filter, and with said bias means reverse biasing said diode modulator when the local transmitter is keyed on, to prevent communication signals from passing through the diode modulator to the input filter.

2. The power line carrier apparatus of claim 1 including leakage means connected across the diode modulator, said leakage means being selected to attenuate the signal level from the local transmitter applied to the input filter of the local receiver, with the magnitude of the attenuated signal being responsive to the magnitude of the unattenuated signal.

3. The power line carrier apparatus of claim 3 wherein the receiver includes a signal strength meter, and the attenuation means includes a first adjustable impedance, with the first and second signal coupling means being connected in parallel between said first adjustable impedance means and the input filter of the receiver, said first adjustable impedance means being set to provide a predetermined indication on said signal strength meter when the local transmitter is keyed on by the keying means.

4. The power line carrier apparatus of claim 3 wherein the first signal coupling means includes a diode modulator, and bias means for said diode modulator, said bias means including a second adjustable impedance device, said second adjustable impedance device being set to provide the desired sensitivity of the receiver.

5. Power line carrier apparatus, comprising:
   a local receiver including an input filter,
   a local transmitter,
   keying means for keying said local transmitter on and off,
   a transmission line,
   attenuation means,
   said receiver being connected to receive communication signals from said transmission line via said attenuation means, with said attenuation means being connected between said transmission line and the input filter of said receiver,
   said transmitter being connected to apply communications signals to said transmission line when it is keyed on by said keying means,
   said attenuation means having an attenuation which is responsive to whether said transmitter is keyed, presenting a higher attenuation to communication signals from said transmission line when said transmitter is keyed on, then when it is not transmitting,
   said attenuation means including first and second signal coupling means connected in parallel between the transmission line and the input filter, with said first signal coupling means being rendered ineffective when the local transmitter is keyed on by the keying means, to reduce the signal strength applied to the input filter, said first signal coupling means including a first transformer having an input winding and a center-tapped output winding, a second transformer having a center-tapped input winding and an output winding, a diode modulator interconnecting the input and output windings of the first and second transformers, and bias means for said diode modulator, said bias means being responsive to the condition of the local transmitter.

6. The power line carrier apparatus of claim 5 wherein the bias means includes an adjustable impedance device which interconnects the center taps of the first and second transformers, with said adjustable impedance device being set to provide the desired sensitivity of the receiver.

7. The power line carrier apparatus of claim 6 wherein the second signal coupling means includes a capacitor connected across the diode modulator, with said capacitor and interconnected center taps of the first and second transformers providing a signal path for the signals from the local transmitter to the input filter when the diode modulator is rendered ineffective to pass a communication signal by the bias means.

* * * * *